US008620991B2

(12) United States Patent
Wolf et al.

(10) Patent No.: US 8,620,991 B2
(45) Date of Patent: *Dec. 31, 2013

(54) TECHNOLOGIES FOR DETECTING ERRONEOUS RESUMPTIONS IN A CONTINUATION BASED RUNTIME

(75) Inventors: Kenneth David Wolf, Seattle, WA (US); Justin David Brown, Seattle, WA (US); Karthik Raman, Issaquah, WA (US); Nathan Christopher Talbert, Seattle, WA (US); Edmund Samuel Victor Pinto, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,498

(22) Filed: Aug. 1, 2012

(65) Prior Publication Data
US 2012/0297077 A1    Nov. 22, 2012

Related U.S. Application Data

(63) Continuation of application No. 12/211,953, filed on Sep. 17, 2008, now Pat. No. 8,255,451.

(51) Int. Cl.
*G06F 15/16* (2006.01)
(52) U.S. Cl.
USPC ........... 709/201; 709/200; 709/227; 714/147; 714/201; 719/311; 719/312; 719/313; 719/318; 710/260; 717/148; 717/149; 717/153
(58) Field of Classification Search
USPC ........... 709/200, 201, 227; 714/201; 719/311, 719/312, 313, 318; 710/260; 717/148, 149, 717/153
See application file for complete search history.

(56) References Cited

U.S. PATENT DOCUMENTS

| | | | | |
|---|---|---|---|---|
| 5,812,768 | A * | 9/1998 | Page et al. | 709/228 |
| 6,119,145 | A * | 9/2000 | Ikeda et al. | 709/203 |
| 6,275,843 | B1 * | 8/2001 | Chorn | 718/101 |
| 6,317,594 | B1 | 11/2001 | Gossman et al. | |
| 6,453,430 | B1 * | 9/2002 | Singh et al. | 714/47.3 |
| 6,606,742 | B1 | 8/2003 | Orton et al. | |
| 6,636,521 | B1 | 10/2003 | Giulianelli | |
| 6,725,252 | B1 * | 4/2004 | Himmel et al. | 709/203 |
| 6,782,537 | B1 * | 8/2004 | Blackmore et al. | 719/313 |
| 6,901,405 | B1 * | 5/2005 | McCrady et al. | 1/1 |
| 6,907,606 | B1 * | 6/2005 | Jang | 718/103 |
| 7,080,374 | B2 * | 7/2006 | Dahlstedt et al. | 718/1 |
| 7,089,461 | B2 | 8/2006 | Gilbert et al. | |
| 7,171,663 | B2 | 1/2007 | Moore et al. | |
| 7,191,440 | B2 * | 3/2007 | Cota-Robles et al. | 718/1 |
| 7,216,346 | B2 * | 5/2007 | Bender et al. | 718/102 |

(Continued)

OTHER PUBLICATIONS

Blumofe, et al., "Cilk: An Efficient Multithreaded Runtime System", Technical Report: TM-548, 1996, pp. 1-26.

(Continued)

*Primary Examiner* — John Follansbee
*Assistant Examiner* — Anthony Mejia
(74) *Attorney, Agent, or Firm* — L. Alan Collins; Collins & Collins Intellectual, LLC

(57) ABSTRACT

Technologies for enabling a continuation based runtime to accept or reject external stimulus and, in addition, to determine if an external stimulus may be valid for processing at a later point in execution.

20 Claims, 4 Drawing Sheets

(56) References Cited

U.S. PATENT DOCUMENTS

| | | | |
|---|---|---|---|
| 7,350,200 B2* | 3/2008 | Lueh et al. | 717/148 |
| 7,412,513 B2* | 8/2008 | Levanoni et al. | 709/225 |
| 7,660,794 B2* | 2/2010 | Scoredos | 726/11 |
| 7,681,133 B2* | 3/2010 | Yaseen et al. | 715/740 |
| 7,689,699 B2* | 3/2010 | Chazin | 709/229 |
| 7,725,885 B1* | 5/2010 | Pradhan et al. | 717/148 |
| 7,788,319 B2* | 8/2010 | Schmidt et al. | 709/203 |
| 7,821,662 B2* | 10/2010 | Matsueda | 358/1.15 |
| 2002/0077871 A1* | 6/2002 | Udelhoven et al. | 705/5 |
| 2002/0097268 A1* | 7/2002 | Dunn et al. | 345/760 |
| 2002/0138321 A1* | 9/2002 | Yuan et al. | 705/8 |
| 2003/0037089 A1* | 2/2003 | Cota-Robles et al. | 709/1 |
| 2004/0068655 A1* | 4/2004 | Nishimura et al. | 713/171 |
| 2004/0133891 A1* | 7/2004 | Dahlstedt et al. | 718/100 |
| 2004/0143833 A1* | 7/2004 | Heyrman et al. | 718/100 |
| 2004/0153807 A1* | 8/2004 | Watt et al. | 714/35 |
| 2004/0267898 A1* | 12/2004 | Parkyn | 709/217 |
| 2004/0268354 A1* | 12/2004 | Kanai et al. | 718/100 |
| 2005/0015776 A1 | 1/2005 | Mehta et al. | |
| 2005/0021641 A1* | 1/2005 | Hasegawa | 709/206 |
| 2005/0093881 A1* | 5/2005 | Okita et al. | 345/589 |
| 2005/0108398 A1* | 5/2005 | Levanoni et al. | 709/225 |
| 2005/0192984 A1 | 9/2005 | Shenfield et al. | |
| 2005/0193061 A1* | 9/2005 | Schmidt et al. | 709/204 |
| 2005/0193286 A1* | 9/2005 | Thatte et al. | 714/48 |
| 2005/0288913 A1 | 12/2005 | Shah et al. | |
| 2005/0289558 A1 | 12/2005 | Illowsky et al. | |
| 2006/0179428 A1* | 8/2006 | Kawachiya et al. | 717/148 |
| 2006/0200828 A1* | 9/2006 | Na | 719/313 |
| 2007/0033250 A1* | 2/2007 | Levin et al. | 709/204 |
| 2007/0078531 A1* | 4/2007 | Adra | 700/31 |
| 2007/0127051 A1* | 6/2007 | Sakayama et al. | 358/1.14 |
| 2007/0239505 A1* | 10/2007 | Shukla et al. | 705/8 |
| 2008/0126545 A1* | 5/2008 | Hopen et al. | 709/226 |
| 2009/0158189 A1* | 6/2009 | Itani | 715/772 |
| 2009/0158283 A1* | 6/2009 | Pinto et al. | 718/102 |
| 2009/0185688 A1* | 7/2009 | Lotspiech et al. | 380/277 |
| 2009/0285375 A1* | 11/2009 | Kremer-Davidson et al. | 379/201.03 |
| 2009/0300648 A1* | 12/2009 | Box et al. | 719/313 |

OTHER PUBLICATIONS

Kusakabe, et al., "OS Mechanism for Continuation-Based Fine-grained Threads on Dedicated and Commodity Processors" Parallel and Distributed Processing Symposium, IEEE International, Mar. 26-30, 2007, pp. 10.

* cited by examiner

TECHNOLOGIES FOR DETECTING ERRONEOUS RESUMPTIONS IN A CONTINUATION BASED RUNTIME

CROSS-REFERENCE TO RELATED APPLICATION(S)

This Application is a Continuation of and claims benefit from U.S. patent application Ser. No. 12/211,953 that was filed on Sep. 17, 2008, and that is incorporated herein by reference in its entirety.

BACKGROUND

A continuation based runtime typically executes activities or programs. An activity typically represents a unit of executable code consisting of multiple pulses of work. One manner in which an activity can execute multiple pulses of work is through the scheduling of child activities. Such a composition of activities typically enables custom control flows that can be implemented through the scheduling of child activities zero or more times as determined by the composite activity. An activity can also setup a resumable continuation or bookmark in its execution that is resumed by a stimulus external to the runtime. The runtime interprets this external stimulus as another pulse of work to be handled by the activity. Pulses of work are typically represented as continuations that the runtime invokes on activities (thus, continuation based runtime). Beyond the flexibility to create new control flows and handle external resumptions, activities generally include the following characteristics: they have no process affinity—they can be paused and resumed in a different process; they have no thread affinity—different pulses of work can run on different threads; they can be persisted and rehydrated.

Dealing with external stimuli can present several complications. For example, multiple stimuli can occur simultaneously. In general, a continuation based runtime processes stimuli as they arrive. A continuation based runtime should be capable of predictably managing multiple external stimuli relative to internal state. Such management is typically performed by assessing validity of the stimulus either for immediate processing or by determining that the activity will never enter a state wherein the stimulus is valid. Such management typically results in a program's ability to accept or reject a stimulus. But it may be desirable to further determine if the stimulus may be valid for processing at a later point in the activity.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for enabling a continuation based runtime to accept or reject external stimulus and, in addition, to determine if an external stimulus may be valid for processing at a later point in execution.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing and networking environment, the environment described is provided as an example and not a limitation. As those skilled in the art will appreciate, the present examples are suitable for application in a variety of different types of computing and networking environments.

Figure 1:
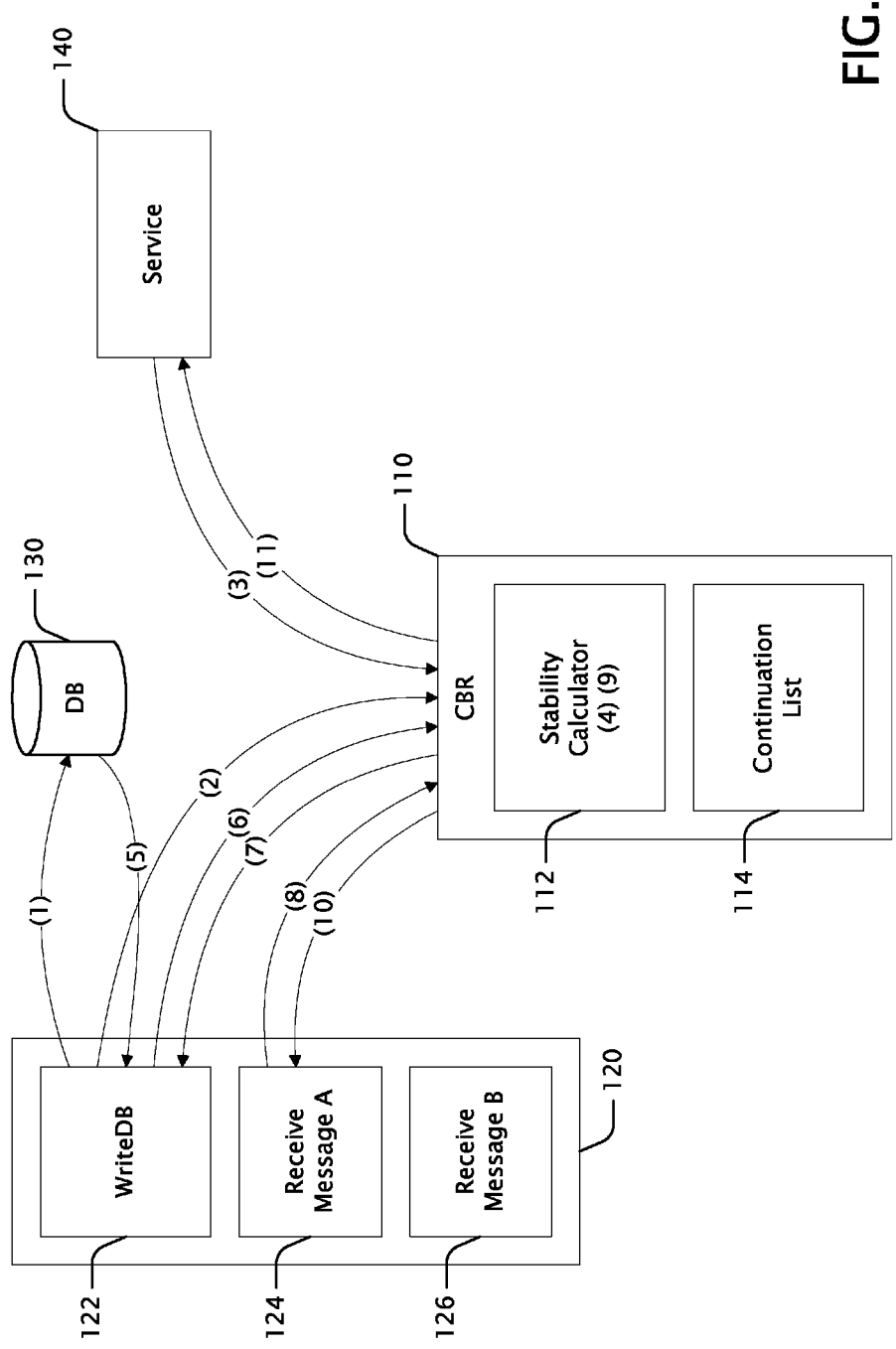
FIG. 1 is a block diagram showing an example continuation based runtime system and an example activity along with example interactions with an example database and an example service.

FIG. 1 is a block diagram showing an example continuation based runtime ("CBR") system 110 and an example activity 120 along with example interactions (1) through (11) with an example database ("DB") 130 and an example service 140. CBR 110 is shown to include an example continuation list 114 and example stability calculator 112 among other elements not shown. Continuation list 114 typically includes a list of continuations that have been created by activities executing in CBR 110.

In one example, CBR 110 supports at least two different types of continuations: conversation continuations and non-conversation continuations. A conversation continuation ("CContinuation") is generally a continuation associated with a conversation between an activity, such as activity 120, and some external party or service, such as service 140. Such a conversation may make use of any suitable protocol and may take place over any span of time, short or long, even over a period of years. In general, an activity (or child activity) may send a message to another party, the message eliciting a responsive message in return. The responsive message may take some time, short or long, even up to several years, to arrive. After sending the initial message, the activity typically creates a CContinuation and then ceases execution while waiting for the response, thus allowing other activities or child activities to be executed or further executed by the CBR. A responsive message typically comprises a request to resume the CContinuation. If the responsive message and/or request to resume are valid, then CBR 110 typically provides the responsive message to activity 120 and executes the CContinuation, thus continuing execution of the activity with the responsive message it was waiting for starting at the point that it ceased execution.

A non-conversation continuation ("NCContinuation") is generally a continuation controlled by an activity or child activity itself when performing some form of external asynchronous (blocking) operation. Requests to resume a NCContinuation generally come from the same activity or child activity that created the NCContinuation as opposed to another party. For example, an activity may request that some information be written to a database, an operation that may take some time, short or long. Once such an operation is complete or the like, a status message of any suitable form is typically returned. Upon receipt of such a status message, activity 120 typically makes a request to resume the NCContinuation corresponding to the status message and CBR 110 continues execution of the activity with the status message it was waiting for starting at the point that it ceased execution.

Continuation list 114 typically contains a list of active continuations such as CContinuations and NCContinuations after they have been created and at least until that have been executed or canceled or the like. Such a list may include additional information about each continuation such as its type (conversation, non-conversation, etc), an identifier ("ID") for the activity or child activity it is associated with, an ID for the conversation it is associated with, a list of governing continuations, etc. In one example, a governing continuation is a continuation on which another continuation is dependent before it can continue execution—that is, a governing continuation must be executed before the continuation is depends on can execute.

Stability calculator 112 typically determines if a request to resume a CContinuation can be immediately accepted, or accepted at a later point in execution, or if it can be immediately rejected. The method for making this determination is described herein below in connection with FIGS. 2 and 3.

Example activity 120 shows a sequence of three child activities. First, WriteDB 122 provides some information to be written into DB 130. Second, Receive Message A 124 expects to receive a Message A as part of a conversation from Service A. Third, Receive Message B expects to receive a Message B as part of a conversation from some other external party. Not shown, both Message A and Message B are part of the same conversation (i.e., are associated with the same conversation ID). In one example, a default conversation ID is associated with all conversation unless otherwise specified.

Activity 120 is a simplified example that may be executed in CBR 110, which may operate in a computing environment such as that described in connection with FIG. 4 or the like. An activity is generally analogous to a program and is typically comprised of computer-executable instructions or the like. An activity may be subdivided into a sequence of child activities (also comprised of computer-executable instructions or the like) such as examples 122, 124, and 126. CBR 110 may execute a plurality of activities concurrently; a single activity 120 and steps (1) through (11) are shown simply as a matter of convenience and for clarity of discussion herein and not as a limitation. Many other child activities, steps, and/or sequences of activities, child activities, and/or steps may alternatively or additionally be executed in a CBR system or the like.

Step (1) shows WriteDB 122 starting an asynchronous operation to write some information to DB 130. Step (2) shows WriteDB 122 creating an NCContinuation for the asynchronous operation and waiting until a status message is returned from DB 130 indicating the completion status of the requested asynchronous operation. Step (3) shows a request to resume CContinuation for Message A (for conversation ID=n) from Service A 140. Note that no CContinuation for Message A has been created to resume at this point in the execution. Step (4) shows stability calculator 112 checking conversation n for stability as described herein below. Since conversation n is unstable, the request to resume the CContinuation for Message A may be accepted at a later point in execution. Step (5) shows DB 130 returning the status message regarding the asynchronous operation. Step (6) shows WriteDB 122 requesting to resume the NCContinuation associated with the asynchronous operation. Step (7) shows CBR 110 continuing execution of WriteDB 122 responsive to the request to resume. Step (8) shows Receive Message A creating a CContinuation for Message A (conversation ID=n); activity 120 then ceases execution. Step (9) shows stability calculator 112 again checking conversation n for stability as described herein below. Since conversation n is now stable, the request to resume CContinuation for Message A from step (3) may be immediately accepted. Step (10) shows execution of Receive Message A 124 being resumed. Step (11) shows a return of "successful" responsive to the request to resume of step (3).

Figure 2:
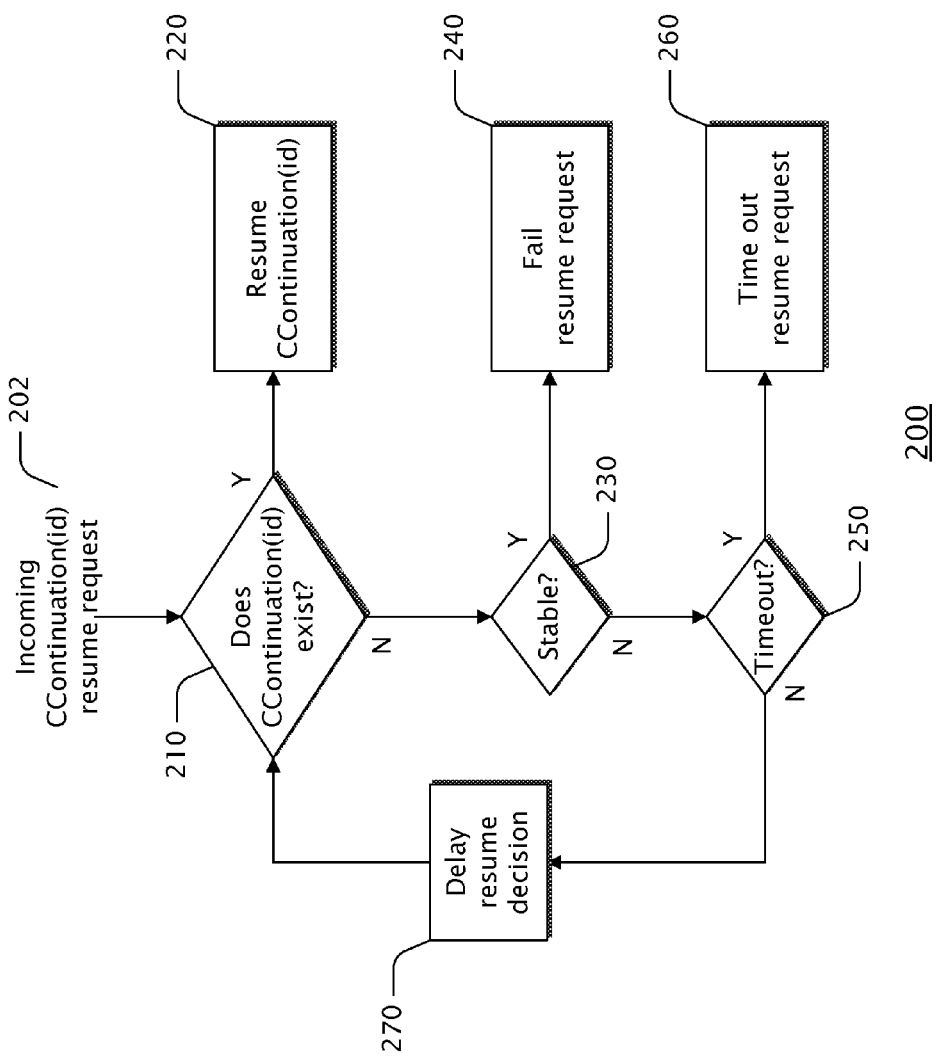
FIG. 2 is a block diagram showing an example method for determining if a request to resume a CContinuation can be immediately accepted, or accepted at a later point in execution, or if it can be immediately rejected.

FIG. 2 is a block diagram showing an example method 200 for determining if a request 202 to resume a CContinuation (e.g., CContinuation ID=i) can be immediately accepted, or accepted at a later point in execution, or if it can be immediately rejected. Method 200 includes block 230 which indicates a method (one example is described in connection with FIG. 3) for determining if a conversation associated with the CContinuation is stable or not. Method 200 is generally performed in response to a request 202 to resume a CContinuation that is associated with a particular conversation (e.g., conversation ID=n). Method 200 is generally performed by a CBR such as CBR 110 of FIG. 1. Method 200 is typically performed in the context of an activity (e.g., activity ID=b) when the activity is idle (i.e., when the activity and its child activities are not executing).

Block 210 typically indicates checking to see if the CContinuation exists. In one example, this includes checking a continuation list, such as list 114 of FIG. 1, to see if CContinuation ID=i has been created. If the CContinuation does exist, then method 200 typically continues at block 220. Otherwise, method 200 typically continues at block 230.

Block 220 typically indicates accepting request 202 and immediately resuming the CContinuation responsive to request 202. In one example, this includes continuing or resuming execution of the activity or child activity that created the CContinuation. This may also including providing information to the activity or child activity from the external party requesting the resumption of the CContinuation, examples of information including, but not limited to, a message or status message or the like including any data suitable to the conversation. Once the CContinuation has been resumed, method 200 is typically complete.

Block 230 typically indicates determining if the conversation associated with the CContinuation is stable. An example method for checking stability is described in connection with FIG. 3. If the conversation is stable, then method 200 typically continues at block 240. Otherwise, method 200 typically continues at block 250.

Block 240 typically indicates rejecting request 202 to resume the CContinuation. This typically includes returning a "failed" message or the like to the party submitting request 202. In this case, there is no CContinuation currently in existence corresponding to request 202 and the conversation associated with request 202 is considered stable (or the conversation associated with request 202 is currently unknown by the means of performing method 200). Note that a CContinuation matches a request if the CContinuation ID of the CContinuation and request match and the associated conversation ID of the CContinuation and request match. Accordingly, in this case no corresponding CContinuation currently exists to resume so a failure message is returned. Once the failure message is returned, method 200 is typically complete.

Block 250 typically indicates determining if a timeout period has expired. This typically includes determining if a particular amount of time has transpired since request 202 has arrived and has not been either accepted or failed. The particular amount of time may be short or long. If there is still time remaining to accept or reject request 202 then method 200 typically continues at block 270. Otherwise, method 200 typically continues at block 260.

Block 260 typically indicates request 202 being timed-out. This typically includes rejecting request 202 and retuning a "timeout" message or the like to the party submitting request 202. In this case there is no CContinuation currently in existence corresponding to request 202 and the conversation associated with request 202 is not considered stable. Once the timeout message is returned, method 200 is typically complete.

Block 270 typically indicates delaying a determination to accept or reject request 202 until a future point in the execution of the corresponding activity or child activity. The delay may end after a specified period of time, short or long, or may end after the creation of a matching CContinuation. Once the delay end, method 200 typically continues at block 210.

Figure 3:
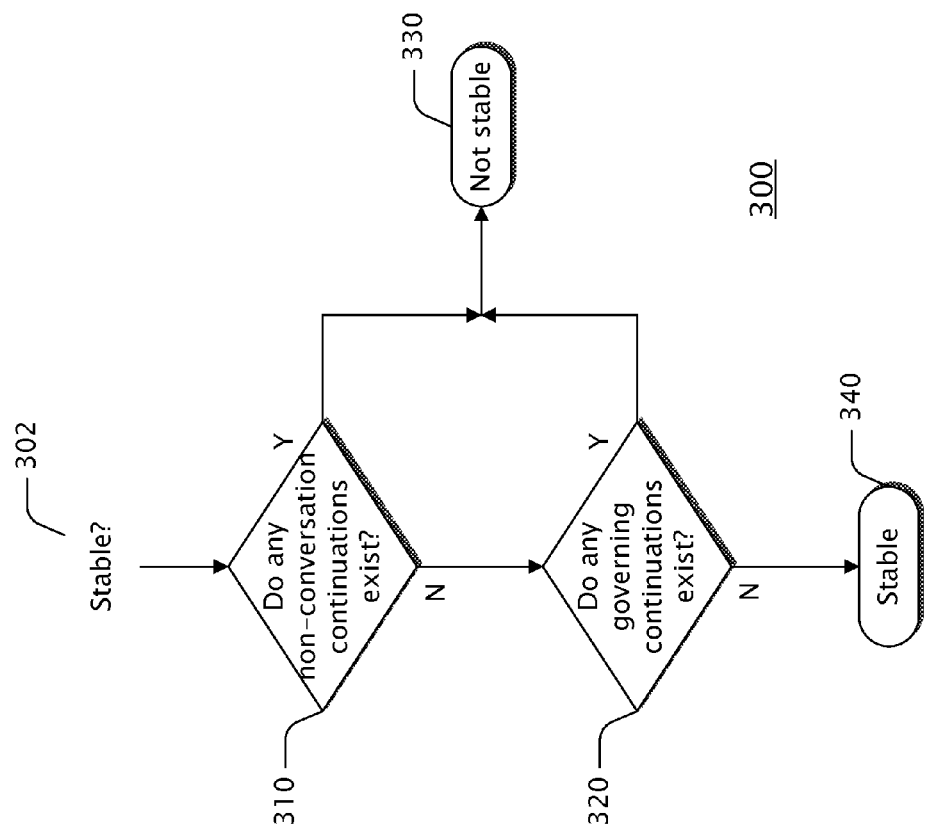
FIG. 3 is a block diagram showing an example method for determining stability of a conversation.

FIG. 3 is a block diagram showing an example method 300 for determining stability of a conversation. Method 300 is generally performed in response to a request 302 to determine if a conversation (e.g., conversation ID=n) is stable, typically a conversation associated with a CContinuation of interest. Method 300 is generally performed by a CBR such as CBR 110 of FIG. 1. Method 300 is typically performed in the context of an activity (e.g., activity ID=b) when the activity is idle (i.e., when the activity and its child activities are not executing).

Block 310 typically indicates determining if any NCContinuations currently exist in the context of the activity (e.g., activity ID=b). If any such NCContinuations do exist, then the conversation is considered unstable. If the conversation is considered unstable, then method 300 typically returns an unstable indicator 330. Otherwise, method 330 typically continues at block 320.

Block 320 typically indicates determining if any governing continuations exist that are associated with the CContinuation of interest. If any such governing continuations do exist, then the conversation is considered unstable. If the conversation is considered unstable, then method 300 typically returns an unstable indicator 330. Otherwise, method 330 typically returns a stable indicator 340.

Figure 4:
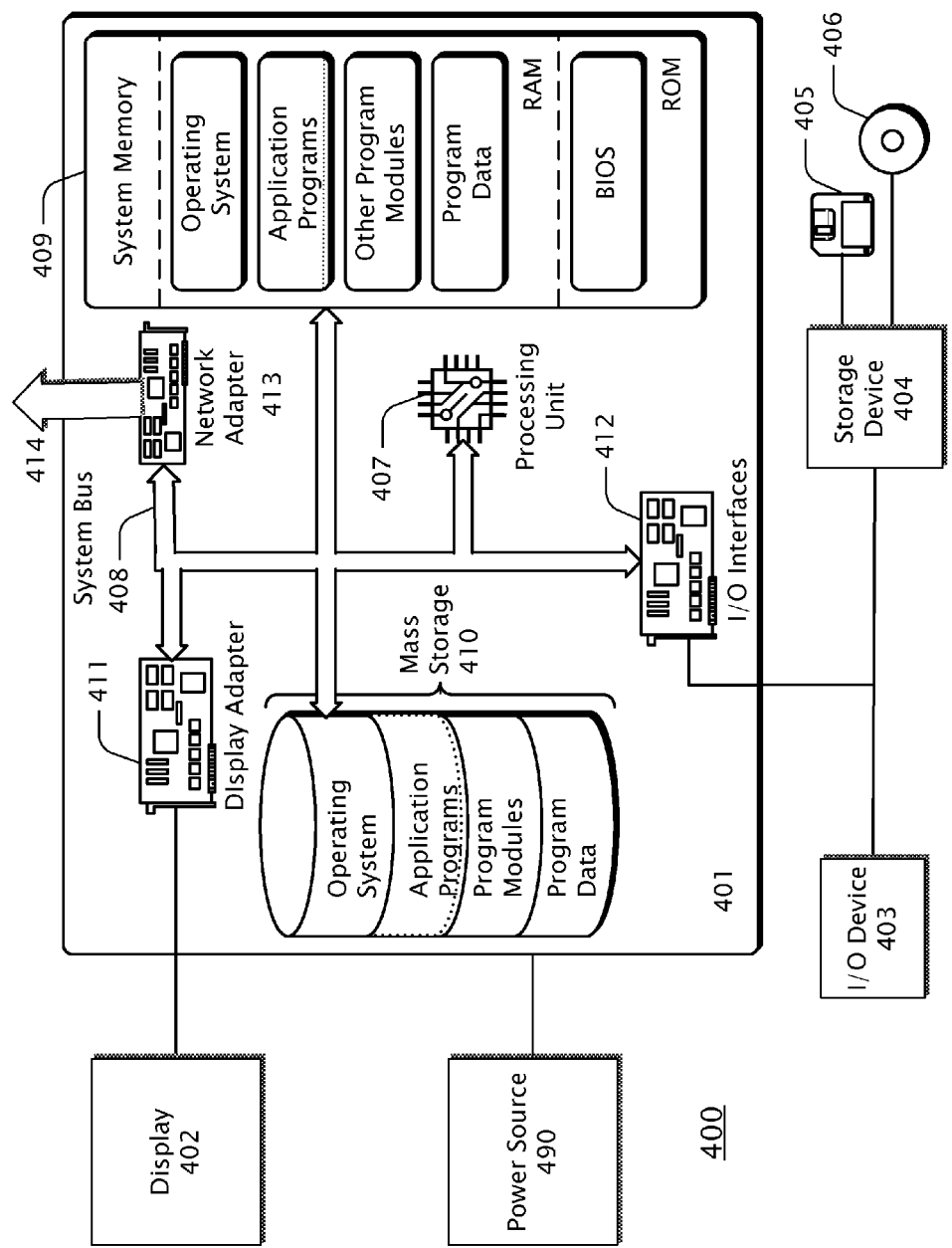
FIG. 4 is a block diagram showing an example computing environment in which the technologies described herein may be implemented.

FIG. 4 is a block diagram showing an example computing environment 400 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 400 typically includes a general-purpose computing system in the form of a computing device 401 coupled to various components, such as peripheral devices 402, 403, 404 and the like. System 400 may couple to various other components, such as input devices 403, including voice recognition, touch pads, buttons, keyboards and/or pointing devices, such as a mouse or trackball, via one or more input/output ("I/O") interfaces 412. The components of computing device 401 may include one or more processors (including central processing units ("CPU"), graphics processing units ("CPU"), microprocessors ("µP"), and the like) 407, system memory 409, and a system bus 408 that typically couples the various components. Processor 407 typically processes or executes various computer-executable instructions to control the operation of computing device 401 and to communicate with other electronic and/or computing devices, systems or environment (not shown) via various communications connections such as a network connection 414 or the like. System bus 408 represents any number of several types of bus structures, including a memory bus or memory controller, a peripheral bus, a serial bus, an accelerated graphics port, a processor or local bus using any of a variety of bus architectures, and the like.

System memory 409 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 409 typically stores data, computer-executable instructions and/or program modules comprising computer-executable instructions that are immediately accessible to and/or presently operated on by one or more of the processors 407.

Mass storage devices 404 and 410 may be coupled to computing device 401 or incorporated into computing device 401 via coupling to the system bus. Such mass storage devices 404 and 410 may include non-volatile RAM, a magnetic disk drive which reads from and/or writes to a removable, non-volatile magnetic disk (e.g., a "floppy disk") 405, and/or an optical disk drive that reads from and/or writes to a non-volatile optical disk such as a CD ROM, DVD ROM 406. Alternatively, a mass storage device, such as hard disk 410, may include non-removable storage medium. Other mass storage devices may include memory cards, memory sticks, tape storage devices, and the like.

Any number of computer programs, files, data structures, and the like may be stored in mass storage 410, other storage devices 404, 405, 406 and system memory 409 (typically limited by available space) including, by way of example and not limitation, operating systems, application programs, data files, directory structures, computer-executable instructions, and the like.

Output components or devices, such as display device 402, may be coupled to computing device 401, typically via an interface such as a display adapter 411. Output device 402 may be a liquid crystal display ("LCD"). Other example output devices may include printers, audio outputs, voice outputs, cathode ray tube ("CRT") displays, tactile devices or other sensory output mechanisms, or the like. Output devices may enable computing device 401 to interact with human operators or other machines, systems, computing environments, or the like. A user may interface with computing environment 400 via any number of different I/O devices 403 such as a touch pad, buttons, keyboard, mouse, joystick, game pad, data port, and the like. These and other I/O devices may be coupled to processor 407 via I/O interfaces 412 which may be coupled to system bus 408, and/or may be coupled by other interfaces and bus structures, such as a parallel port, game port, universal serial bus ("USB"), fire wire, infrared ("IR") port, and the like.

Computing device 401 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 401 may be coupled to a network via network adapter 413 or the like, or, alternatively, via a modem, digital subscriber line ("DSL") link, integrated services digital network ("ISDN") link, Internet link, wireless link, or the like.

Communications connection 414, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 490, such as a battery or a power supply, typically provides power for portions or all of computing environment 400. In the case of the computing environment 400 being a mobile device or portable device or the like, power source 490 may be a battery. Alternatively, in the case computing environment 400 is a desktop computer or server or the like, power source 490 may be a power supply designed to connect to an alternating current ("AC") source, such as via a wall outlet.

Some mobile devices may not include many of the components described in connection with FIG. 4. For example, an electronic badge may be comprised of a coil of wire along with a simple processing unit 407 or the like, the coil configured to act as power source 490 when in proximity to a card reader device or the like. Such a coil may also be configure to act as an antenna coupled to the processing unit 407 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 402, I/O device 403, or many of the other components described in connection with FIG. 4. Other mobile devices that may not include many of the components described in connection with FIG. 4, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and theft associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device, the method comprising:
rejecting, in response to a conversation continuation not existing on a system and a non-conversation continuation or a governing continuation existing on the system, a request to resume the conversation continuation, where the conversation continuation is configured for resuming an activity in response to a message from an external service that is engaged in a conversation with the activity, where the non-conversation continuation is configured for resuming the activity in response to a message indicating completion of an operation associated with the activity, where the governing continuation is configured for controlling continued execution of dependent continuations, and where the conversation continuation and the non-conversation continuation are included in a continuation list;
delaying, in response to the conversation continuation not existing on the system and no non-conversation continuations or governing continuations existing on the system, handling of the request to resume the conversation continuation; and
accepting, in response to the conversation continuation existing on the system, the request to resume the conversation continuation.

2. The method of claim 1 where the conversation continuation is a continuation associated with the conversation between the activity and the external service.

3. The method of claim 1 where the non-conversation continuations are continuations that are controlled by activities that perform blocking operations.

4. The method of claim 1 where the governing continuations are continuations on which other continuations depend.

5. The method of claim 1 where the method is performed in the context of the activity when the activity is idle.

6. The method of claim 1 where the accepting comprises resuming the conversation continuation.

7. The method of claim 6 where the resuming comprises providing information to the activity, the information provided by a service that submitted the request to resume the conversation continuation.

8. At least one storage device storing computer executable instructions that, when executed by a computing device, cause the computing device to perform actions for handling a request to resume a conversation continuation, the actions comprising:

rejecting, in response to a conversation continuation not existing on a system and a non-conversation continuation or a governing continuation existing on the system, a request to resume the conversation continuation, where the conversation continuation is configured for resuming an activity in response to a message from an external service that is engaged in a conversation with the activity, where the non-conversation continuation is configured for resuming the activity in response to a message indicating completion of an operation associated with the activity, where the governing continuation is configured for controlling continued execution of dependent continuations, and where the conversation continuation and the non-conversation continuation are included in a continuation list;

delaying, in response to the conversation continuation not existing on the system and no non-conversation continuations or governing continuations existing on the system, handling of the request to resume the conversation continuation; and accepting, in response to the conversation continuation existing on the system, the request to resume the conversation continuation.

9. The at least one storage device of claim 8 where the conversation continuation is a continuation associated with the conversation between the activity and the external service.

10. The at least one storage device of claim 8 where the non-conversation continuations are continuations that are controlled by activities that perform blocking operations.

11. The at least one storage device of claim 8 where the governing continuations are continuations on which other continuations depend.

12. The at least one storage device of claim 8 where the method is performed in the context of the activity when the activity is idle.

13. The at least one storage device of claim 8 where the accepting comprises resuming the conversation continuation.

14. The at least one storage device of claim 13 where the resuming comprises providing information to the activity, the information provided by a service that submitted the request to resume the conversation continuation.

15. A system comprising:

a computing device including a hardware processor configured for rejecting, in response to a conversation continuation not existing on the system and a non-conversation continuation or a governing continuation existing on the system, a request to resume the conversation continuation, where the conversation continuation is configured for resuming an activity in response to a message from an external service that is engaged in a conversation with the activity, where the non-conversation continuation is configured for resuming the activity in response to a message indicating completion of an operation associated with the activity, where the governing continuation is configured for controlling continued execution of dependent continuations, and where the conversation continuation and the non-conversation continuation are included in a continuation list;

the computing device further configured for delaying, in response to the conversation continuation not existing on the system and no non-conversation continuations or governing continuations existing on the system, handling of the request to resume the conversation continuation; and the computing device further configured for accepting, in response to the conversation continuation existing on the system, the request to resume the conversation continuation.

16. The system of claim 15 where the conversation continuation is a continuation associated with the conversation between the activity and the external service.

17. The system of claim 15 where the non-conversation continuations are continuations that are controlled by activities that perform blocking operations.

18. The system of claim 15 where the governing continuations are continuations on which other continuations depend.

19. The system of claim 15 where the accepting comprises resuming the conversation continuation.

20. The system of claim 19 where the resuming comprises providing information to the activity, the information provided by a service that submitted the request to resume the conversation continuation.

* * * * *